Patented Jan. 3, 1928.

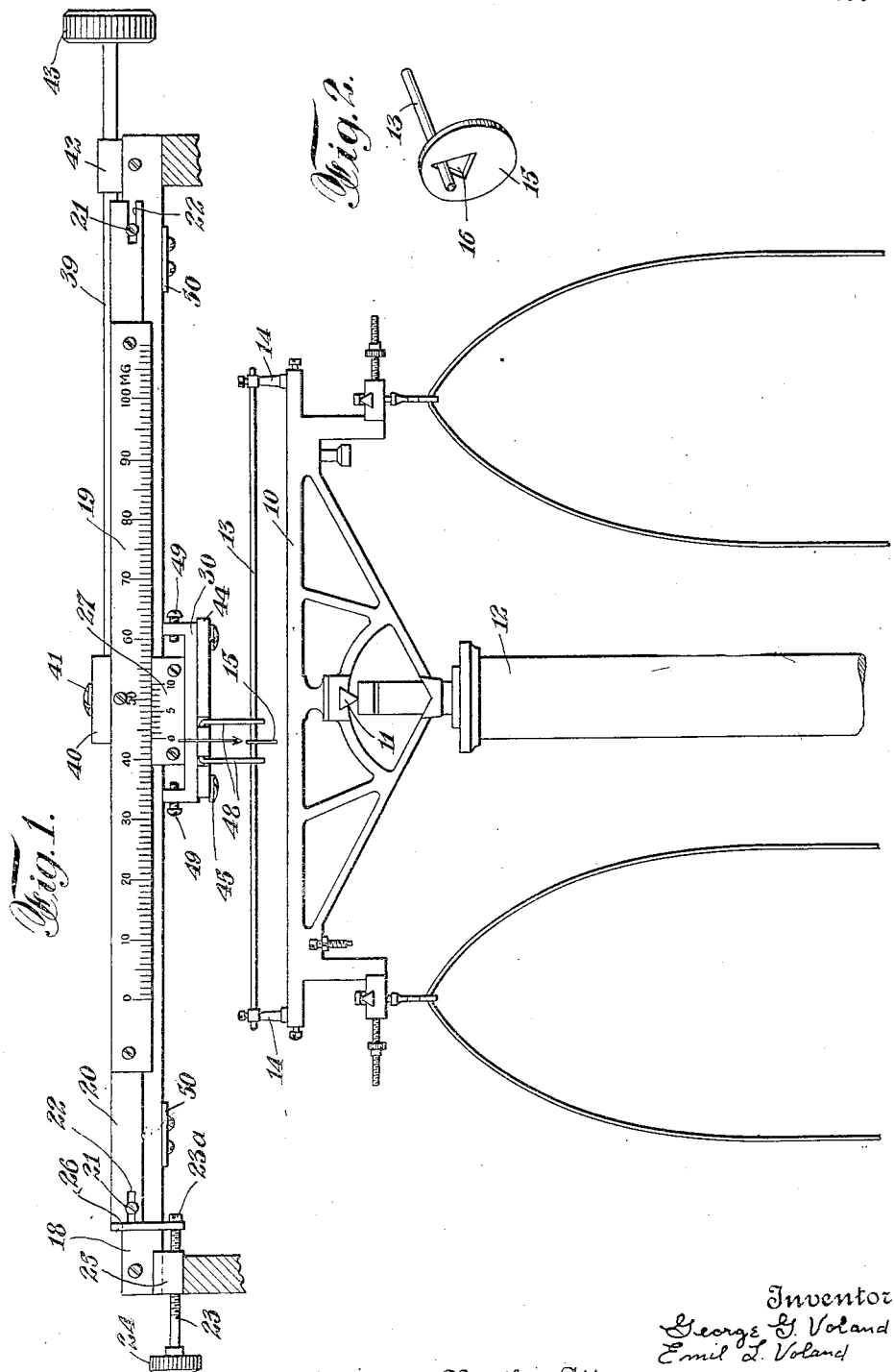

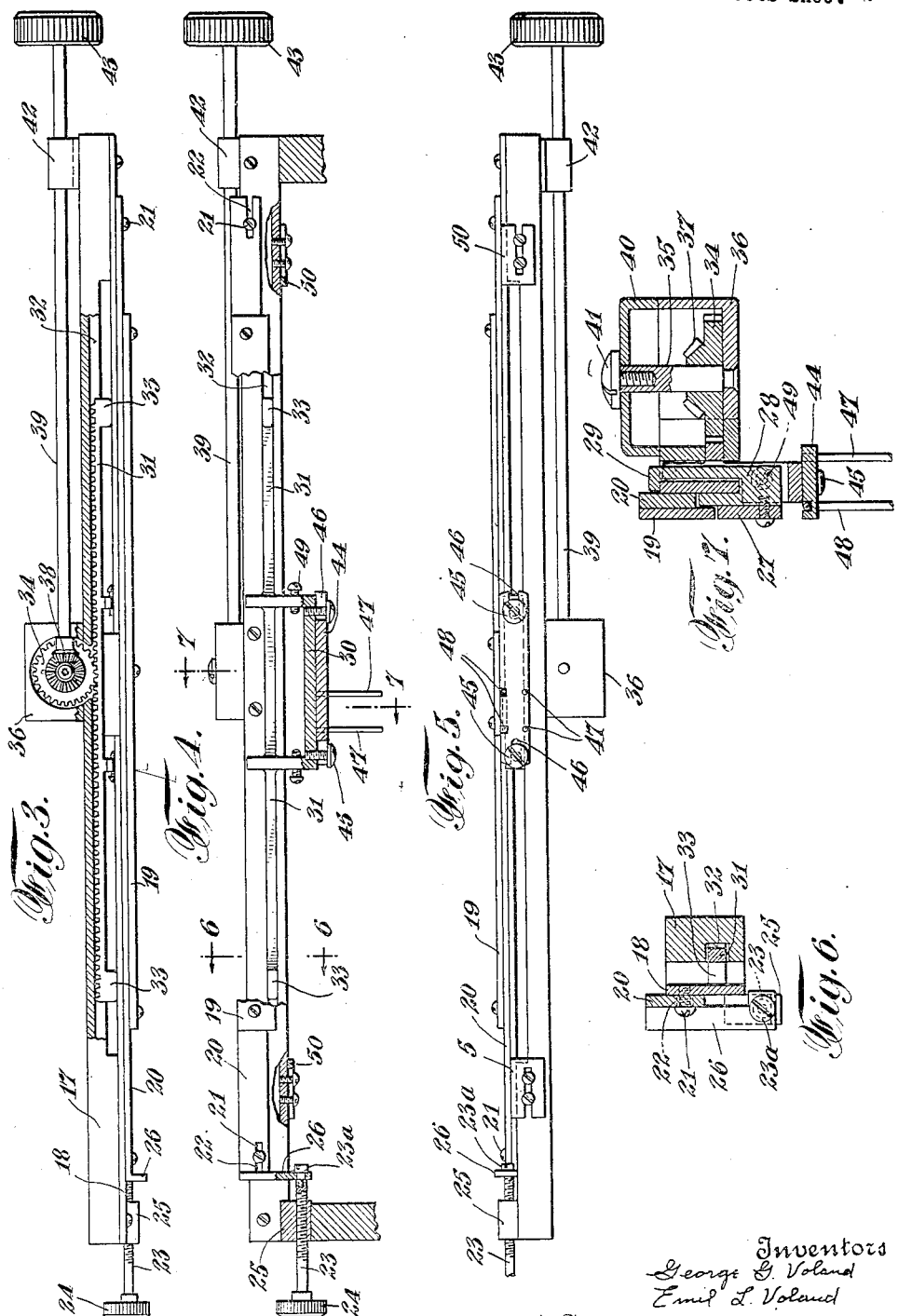

1,655,118

UNITED STATES PATENT OFFICE.

GEORGE G. VOLAND AND EMIL L. VOLAND, OF NEW ROCHELLE, NEW YORK.

WEIGHT-PLACING AND VERNIER ATTACHMENT.

Application filed March 24, 1927. Serial No. 177,968.

The present invention relates to improvements in weight placing and vernier attachments for use particularly with analytical balances.

The present invention especially aims to improve the device shown in our prior Patent, No. 1,301,765, dated April 22, 1919.

Among the principal objects which this invention has in view are: to provide an attachment in which the balance member may be advanced on the scale beam by a sliding movement; to provide a vernier for showing the fraction of a divisional space where the balancing member is placed in service and a single means for operating the balance member and vernier; to allow for lost motion between the operating means and balance member and vernier to insure against inaccuracies due to frictional engagement between the balance member and operating means; to provide a simple means for setting the scales at zero to correspond to the equilibrium position of the balance member; and to simplify and facilitate the handling of the scales.

In the drawings:

Figure 1 is a front view of a scale beam and weight placing and vernier attachment therefor;

Figure 2 is a perspective view of the balancing member showing the manner of disposing the same in service;

Figure 3 is a top plan view partly in section of the weight placing and vernier attachment;

Figure 4 is a front elevational view partly in section of the attachment.

Figure 5 is a bottom view of the attachment;

Figure 6 is a sectional view on line 6—6 of Figure 4;

Figure 7 is a sectional view on line 7—7 of Figure 4.

In the construction shown, the scale beam 10 is pivoted on a knife blade 11 supported on a post 12. Superposed on the scale beam is a slender rod 13 of circular section which extends longitudinally of the scale beam and is detachably associated therewith by means of binding post 14. A balance member or weight 15 is slidably mounted on the rod 13 and to this end the balance member which is in the form of a disk has a perforation 16, preferably triangular in shape and offset from the center of the balance member through which perforation the rod 13 extends. By means of this construction the weight of the balance member serves to always maintain it centrally disposed on the rod 13 and in the position shown in Figure 2.

The frame of the attachment is composed of two parts, 17 and 18, joined together in some suitable manner. The part 18 serves as a support for a scale 19 calibrated to read in terms of weight. This scale is carried adjustably attached to the part 18 by means of set screws 21, which extend through slots 22 in the bar 20. The position of the sliding bar and consequently of the scale 19 may be adjusted by an adjusting screw 23 having a knurled head 24, the adjusting screw extending through an offset portion 25 of the part 18 and having its end attached to another offset portion 26 of the bar 20 as by means of a small screw 23$^a$. Thus when the adjusting screw 23 is rotated the bar 20 is caused to be moved longitudinally so as to change and adjust the position of the scale 19 with respect to the frame.

Below and contiguous the scale 19 is a vernier scale 27 supported by a carrier member 28 which has a tongue and groove connection with the part 18 and also has a portion 29 which overlaps the top of the part 18. This vernier is disposed within a U shaped member 30 which is attached as by soldering to a rack 31 slidably mounted in a longitudinal groove 32 in the part 17 of the frame, and having projections 33 on its back face bearing against the part 18, to insure pure rectilinear motion of the rack. The rack meshes with the pinion 34 which loosely encircles a post 35 centrally disposed in a box portion 36 secured to the back of the attachment. The pinion has a bevel gear 37 integrally formed with it on its upper surface and meshing with another bevel gear 38 on the end of a circular rod 39. This rod is journaled between the box 36 and the cover 40 therefor, said cover being detachably secured in place by means of a screw 41 extending into the post 35. The rod 39 also extends through another bearing member 42 on the back of the attachment and has an enlarged knurled knob 43 on its end to serve as a finger means for rotating the rod.

Beneath the U shaped member there is disposed a bar 44 adjustably attached to the U shaped member by means of set screws 45 which extend through slots 46 in the bar and into the U shaped member. The bar carries two pairs of fingers 47 and 48 disposed on opposite sides of the rod 13 and straddling the balance member 15. The back pair of fingers 47 are rigidly attached to the bar 44 while the front pair 48 are in the form of an inverted U with the bight portion situated in a groove in the bar 44 so as to permit free pivotal movement of the fingers 48. The two legs of the U shaped member 30 have screws 49 extending through them for the purpose of adjusting the position of the vernier within the U shaped member. Stops 50 are also provided on the lower part of the attachment to limit the extent of the longitudinal movement of the U shaped member. These stops may also be adjusted.

In the operation and use of the invention the vernier and balance member 15 are first moved to the zero position. The article to be weighted is then placed in the left-hand pan as seen in Figure 1 and weights to the nearest 100 milligrams are placed in the right-hand scale. The knob 43 is then turned to cause the advancement of the U shaped member 30, and consequently of the vernier scale and the balance member 15. The weight is advanced to the position at which the two pans balance and in this position the exact weight of the article may be obtained by reading the scale 19 and the vernier 27. In order to prevent any inaccuracy the knob 43 is turned back slightly before a reading is taken so that the fingers are withdrawn from engagement with the balance member as shown in Figure 1. Thus there is no friction between the fingers and the balance member to serve to decrease the effective weight of the balance member and to lead to inaccuracies. This reverse movement does not interfere with the position of the vernier because of the lost motion between it and the U shaped member.

The purpose of adjusting screw 23 is to set the readings on the scales at zero to correspond to the equilibrium point, that is, the point at which the pans balance when there are no weights upon them whatsoever. The result is obtained by moving the balance member 15 to that position at which the scales balance and then by turning the adjusting screw until the zero on the scale 19 coincides with the zero on the vernier. All readings, therefore, are taken from a zero and it is not necessary to calibrate in order to allow for an initial zero reading, the weight being obtained directly by the reading on the scales.

It will be apparent that many variations may be made in the construction shown without departing from the spirit of the invention and we desire to be limited only by the state of the prior art and the scope of the appended claims.

We claim:

1. In a weighing scales, a scale beam, a longitudinally extending rod associated therewith, a balance member slideably disposed on the rod and having a triangular, centrally offset perforation for the accommodation of the rod, and means for slideably moving the balance member along the rod.

2. In a weighing scales, a scale beam, a scale calibrated to read in terms of weight, a balance member associated with the beam, a U-shaped member slideably associated with the scale, a vernier disposed within the U-shaped member and adapted for limited free movement therewithin, fingers carried by the U-shaped member and disposed on opposite sides of the balance member, and means for imparting movement to the operating member.

3. In a weighing scales, a scale beam, a scale calibrated to read in terms of weight, a balance member associated with the beam, a vernier, means for simultaneously moving the balance member and vernier, and means for changing the position of the scale whereby the zero of the scale coincides with the zero of the vernier when the balance member is in its equilibrium position.

4. In a weighing scales, a scale beam, a scale calibrated to read in terms of weight, a balance member associated with the beam, a vernier cooperating with the scale, and means for simultaneously moving the balance member along the beam and the vernier along the scale, said means permitting a limited amount of lost motion in operating the balance member and vernier.

In testimony whereof, we have signed our names to this specification this 25 day of February, 1927.

GEORGE G. VOLAND.
EMIL L. VOLAND.